(12) United States Patent
Yuki et al.

(10) Patent No.: US 11,091,037 B2
(45) Date of Patent: Aug. 17, 2021

(54) IN-VEHICLE INSTALLATION STRUCTURE FOR ELECTRIC DEVICE

(71) Applicant: TOYOTA JIDOSHA KABUSHIKI KAISHA, Toyota (JP)

(72) Inventors: Keisuke Yuki, Toyota (JP); Takuya Yashiki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 290 days.

(21) Appl. No.: 16/188,472

(22) Filed: Nov. 13, 2018

(65) Prior Publication Data

US 2019/0193565 A1    Jun. 27, 2019

(30) Foreign Application Priority Data

Dec. 25, 2017 (JP) .............................. JP2017-248192

(51) Int. Cl.
| | | |
|---|---|---|
| *B60L 3/00* | (2019.01) | |
| *H02K 5/22* | (2006.01) | |
| *B60K 6/22* | (2007.10) | |
| *H02K 11/33* | (2016.01) | |
| *B60R 16/02* | (2006.01) | |

(52) U.S. Cl.
CPC ............. *B60L 3/0007* (2013.01); *B60K 6/22* (2013.01); *H02K 5/225* (2013.01); *H02K 11/33* (2016.01); *B60R 16/0215* (2013.01); *B60Y 2200/92* (2013.01)

(58) Field of Classification Search
CPC .......... B60L 3/0007; B60L 3/00; B60K 6/22; H02K 11/33; H02K 5/225; B60R 16/0215; B60Y 2200/92
See application file for complete search history.

(56) References Cited

U.S. PATENT DOCUMENTS

| | | | | |
|---|---|---|---|---|
| 8,893,843 | B2* | 11/2014 | Hayano | ................. B60L 15/007 |
| | | | | 180/232 |
| 9,205,749 | B2* | 12/2015 | Sakamoto | ............... B60L 50/61 |
| 2015/0021114 | A1* | 1/2015 | Hotta | .................... B60L 3/0069 |
| | | | | 180/279 |
| 2015/0214812 | A1 | 7/2015 | Tooyama et al. | |
| 2017/0018939 | A1 | 1/2017 | Shiba | |

FOREIGN PATENT DOCUMENTS

| | | |
|---|---|---|
| JP | 2009-038920 A | 2/2009 |
| JP | 2015-140059 A | 8/2015 |
| JP | 2017-019460 A | 1/2017 |
| JP | 2018-023217 A | 2/2018 |

* cited by examiner

*Primary Examiner* — Mohamad A Musleh
(74) *Attorney, Agent, or Firm* — Oliff PLC

(57) ABSTRACT

An in-vehicle installation structure for an electric device installed in a front compartment of a vehicle includes: a structure disposed in a front compartment of a vehicle; an electric device fixed to an upper portion of the structure; a connector connected to a rear upper portion of the electric device; and a protector extending upward from the electric device, the protector being disposed behind the connector of the electric device.

6 Claims, 5 Drawing Sheets

IN-VEHICLE INSTALLATION STRUCTURE FOR ELECTRIC DEVICE

INCORPORATION BY REFERENCE

The disclosure of Japanese Patent Application No. 2017-248192 filed on Dec. 25, 2017 including the specification, drawings and abstract is incorporated herein by reference in its entirety.

BACKGROUND

1. Technical Field

The present disclosure relates to an in-vehicle installation structure for an electric device installed in a front compartment of a vehicle.

2. Description of Related Art

In recent years, various electric devices are installed in a front compartment of an automobile. Particularly, in the case of an electric automobile provided with a traveling motor, an electric device such as an inverter or a voltage converter through which a high voltage flows is installed in a front compartment of a vehicle. A connector is connected to the electric device. In a case where there is collision of the automobile, the connector may come into contact with other structures and may be damaged such that a terminal is exposed while a high voltage is being applied to the terminal.

Japanese Unexamined Patent Application Publication No. 2017-019460 (JP 2017-019460 A) discloses a technique for reducing damage that a connector connected to a rear upper portion of an electric device receives at the time of vehicle collision due to interference between the connector and a structure disposed on a rear side. In the technique disclosed in JP 2017-019460 A, an upper surface of the connector is inclined such that the height thereof decreases toward a vehicle rear side. When the electric device moves back and interferes with the structure on the rear side, the structure moves upward relative to the electric device as though the structure slides on the inclined upper surface of the connector. Therefore, an impact at the time of interference between the connector and the structure is alleviated.

SUMMARY

The present disclosure provides a technique of more reliably protecting a connector that is attached to a rear upper portion of an electric device installed in a front compartment.

An aspect of the present disclosure relates to an in-vehicle installation structure for an electric device installed in a front compartment. The in-vehicle installation structure includes a structure, an electric device, a connector, and a protector. The structure is disposed in a front compartment of a vehicle. The electric device is fixed to an upper portion of the structure. The connector is connected to a rear upper portion of the electric device. The protector extends upward from the electric device and is disposed behind the connector of the electric device. In the in-vehicle installation structure, the protector protects the connector from collision between the connector and another structure disposed on a rear side.

The in-vehicle installation structure according to the aspect of the present disclosure may further include another connector connected to a rear surface of the electric device. In this case, a portion of the protector may cover a position at which a fixing member that fixes the other connector to the electric device is detached. In a case where the configuration as described is adopted, it is not possible to remove the other connector without removing the protector. It is possible to restrain forgetting to attach or detach the other connector by intentionally making an operation of removing the other connector troublesome.

In the in-vehicle installation structure according to the aspect of the present disclosure, the protector may have a shape of which the width decreases toward an upper side and a lower end of the protector may be provided with a reinforcement member. The reinforcement member increases the strength of the protector. In the in-vehicle installation structure according to the aspect of the present disclosure, the structure may be a housing that accommodates a motor for traveling and the electric device may be an electric power controller that supplies drive electric power to the motor.

Details and further improvement of a technology disclosed in the present disclosure will be described in "DETAILED DESCRIPTION OF EMBODIMENTS" below.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
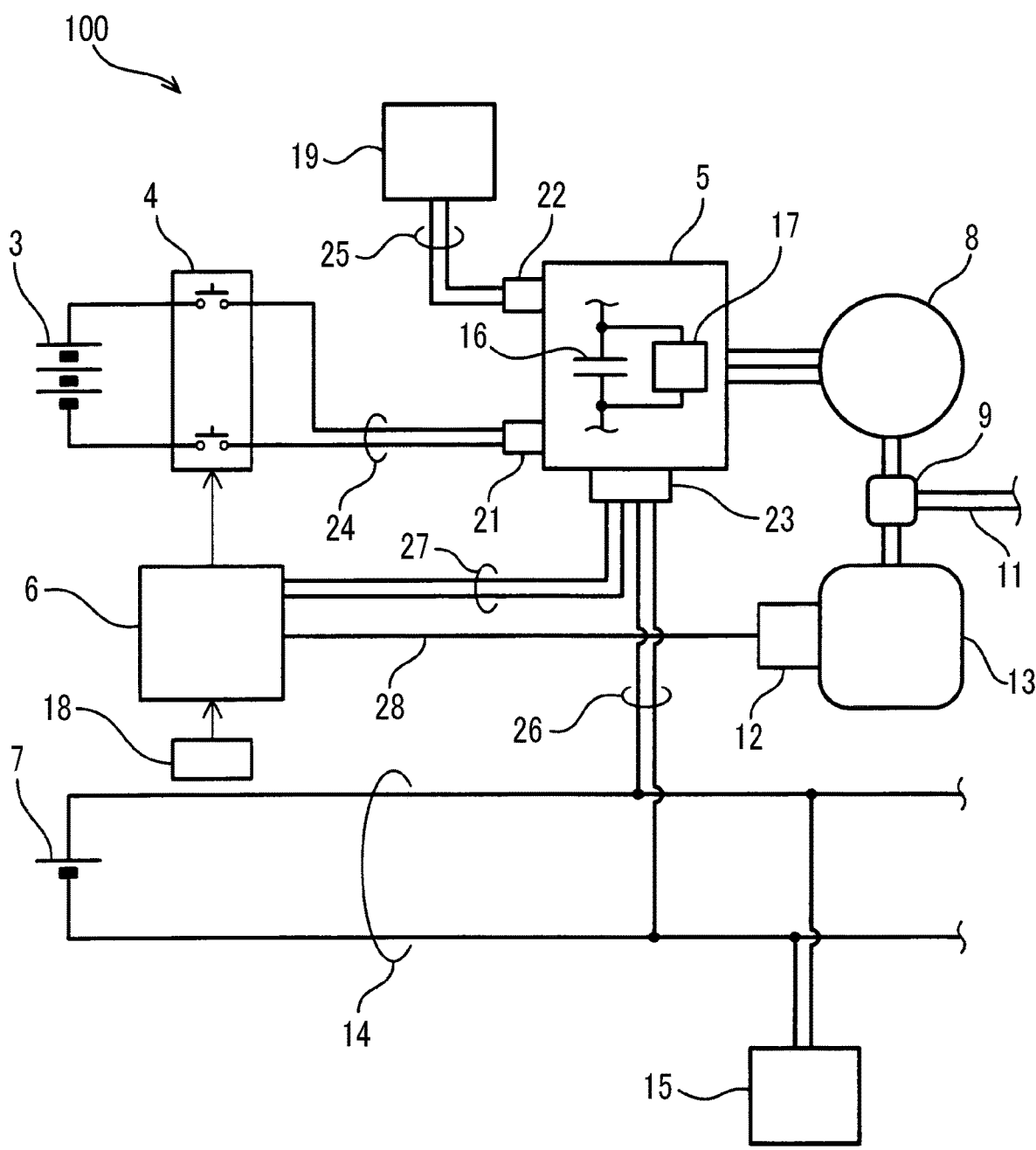
FIG. 1 is a block diagram of an electric power system of a hybrid vehicle to which an in-vehicle installation structure according to an embodiment is applied.

An in-vehicle installation structure according to an embodiment will be described with reference to drawings. The in-vehicle installation structure according to the embodiment is adopted for an electric power control unit of a hybrid vehicle 100 provided with a traveling motor and an engine. First, an electric power system of the hybrid vehicle 100 will be described. FIG. 1 illustrates a block diagram of the electric power system of the hybrid vehicle 100. Note that, some components that are not needed in describing the technology disclosed in the present disclosure are not shown in the block diagram in FIG. 1.

The hybrid vehicle 100 is provided with an electric motor (traveling motor 8) for traveling and an engine 13. Hereinafter, for the sake of simplifying the description, the traveling motor 8 will be simply referred to as "motor 8". The output of the motor 8 and the output of the engine 13 are combined with each other by a power distribution mechanism 9 and output to an axle 11. The power distribution mechanism 9 distributes the output torque of the engine 13 to the axle 11 and the motor 8 in some cases. At this time, the motor 8 generates electric power by using a portion of the output torque of the engine 13. Alternatively, the motor 8 generates electric power by using the deceleration energy of a vehicle. Electric power obtained in the electric power generation is used to charge a high-voltage battery 3 via an electric power control unit 5. An engine controller 12 is attached to a casing of the engine 13. The engine controller 12 is connected with a hybrid vehicle controller 6 that controls the entire vehicle (hereinafter, referred to as "HV controller 6") via an engine wire harness 28. The engine wire harness 28 is a communication cable for transmission of various signals between the HV controller 6 and the engine controller 12.

The motor 8 is driven by alternating current electric power supplied from the electric power control unit 5. The electric power control unit 5 converts direct current power of the high-voltage battery 3 into alternating current electric power suitable for the driving of the motor 8 and supplies the alternating current electric power to the motor 8. The output of the high-voltage battery 3 is, for example, 300 volts. Hereinafter, for the sake of convenience, the "electric power control unit 5" will be referred to as "PCU 5".

The PCU 5 is provided with a voltage converter circuit and an inverter circuit. The voltage converter circuit boosts the electric power of the high-voltage battery 3 to a voltage suitable for the driving of the motor 8. The voltage after the boosting is, for example, 600 volts. The inverter circuit converts the boosted direct current electric power into three-phase alternating current electric power having a frequency suitable for the driving of the motor 8. The inverter circuit also has a function of converting alternating current electric power generated by the motor 8 into direct current electric power. The voltage converter circuit also has a function of boosting the voltage of electric power after direct current conversion in the inverter circuit up to the voltage of the high-voltage battery 3. That is, the voltage converter circuit built into the PCU 5 is a bidirectional DC-DC converter (direct current-to-direct current converter). Detailed description about the voltage converter circuit and the inverter circuit will be omitted.

The PCU 5 is provided with a capacitor 16 that smooths the electric current of the high-voltage battery 3. The PCU 5 is provided with a discharge circuit 17 that discharges the capacitor 16 at the time of vehicle collision. The discharge circuit 17 is, for example, a discharge resistor. Alternatively, the voltage boosting converter circuit or the inverter circuit may be used as the discharge circuit.

The voltage of the high-voltage battery 3 is applied to the capacitor 16 and the discharge circuit 17 discharges the capacitor 16 in the case of vehicle collision so that safety of the PCU 5 is secured. A discharge command to activate the discharge circuit 17 such that the capacitor 16 is discharged is transmitted to the PCU 5 from the HV controller 6. When the HV controller 6 receives a signal indicating that the vehicle has collided with an object from an airbag controller 18, the HV controller 6 transmits the discharge command to the PCU 5. At the same time, the HV controller 6 opens a system main relay 4 that electrically connects the high-voltage battery 3 and the PCU 5 to each other. When the system main relay 4 is opened, the PCU 5 is disconnected from the high-voltage battery 3, supply of electric power to the capacitor 16 is stopped, and it becomes possible to discharge the capacitor 16. The airbag controller 18 is provided with an acceleration sensor that detects collision of the vehicle. When the acceleration sensor detects an acceleration of a predetermined magnitude or more, the airbag controller 18 transmits the signal indicating that the vehicle has collided with an object to the HV controller 6.

The high-voltage battery 3 and the PCU 5 are connected to each other via a high-voltage electric power line 24. One end of the high-voltage electric power line 24 is connected to a high-voltage connector 21 provided for the PCU 5. That is, the power of the high-voltage battery 3 is supplied to the PCU 5 through the high-voltage electric power line 24 and the high-voltage connector 21. The system main relay 4 is provided in the middle of the high-voltage electric power line 24.

The PCU 5 also functions as a relay that transmits the electric power of the high-voltage battery 3 to an air conditioner 19. An air conditioner connector 22 is connected to the PCU 5 and the electric power of the high-voltage battery 3 is transmitted to the air conditioner 19 from the PCU 5 via the air conditioner connector 22 and an air conditioner electric power line 25.

A control circuit that is driven by a low voltage is also accommodated in the PCU 5. Here, the low voltage is a voltage lower than the output voltage of the high-voltage battery 3 as described above. The PCU 5 is also connected to an auxiliary device battery 7 in order to supply electric power to the control circuit. The output voltage of the auxiliary device battery 7 is lower than the output voltage of the high-voltage battery 3 and is, for example, 12 volts. The PCU 5 and the auxiliary device battery 7 are connected to each other via an auxiliary device common electric power line 14 and a low-voltage electric power line 26. One end of the low-voltage electric power line 26 is connected to a low-voltage connector 23 provided for the PCU 5. The auxiliary device common electric power line 14 is an electric power line routed within the vehicle and supplies power to various auxiliary devices. The "auxiliary device" is a general term for a group of devices driven by a low voltage. Examples of the auxiliary device include a car navigation device 15. The control circuit that is mounted in the PCU 5 and is operated by a low voltage also belongs to the "auxiliary device".

In addition to the low-voltage electric power line 26, a PCU wire harness 27 is connected to the low-voltage connector 23. The PCU wire harness 27 is a communication cable for communicating various signals between the PCU 5 and the HV controller 6. The above-described discharge command is also transmitted to the PCU 5 from the HV controller 6 through the PCU wire harness 27. When the low-voltage connector 23 is damaged before the HV controller 6 transmits the discharge command to the PCU 5 in the case of vehicle collision, there is a possibility that the PCU 5 cannot appropriately receive the discharge command so that the capacitor 16 is not discharged. The hybrid vehicle 100 has a structure in which the low-voltage connector 23 is not likely to be damaged in the case of frontal collision. Next, an in-vehicle installation structure 2 for the PCU 5 will be described.

Figure 2:
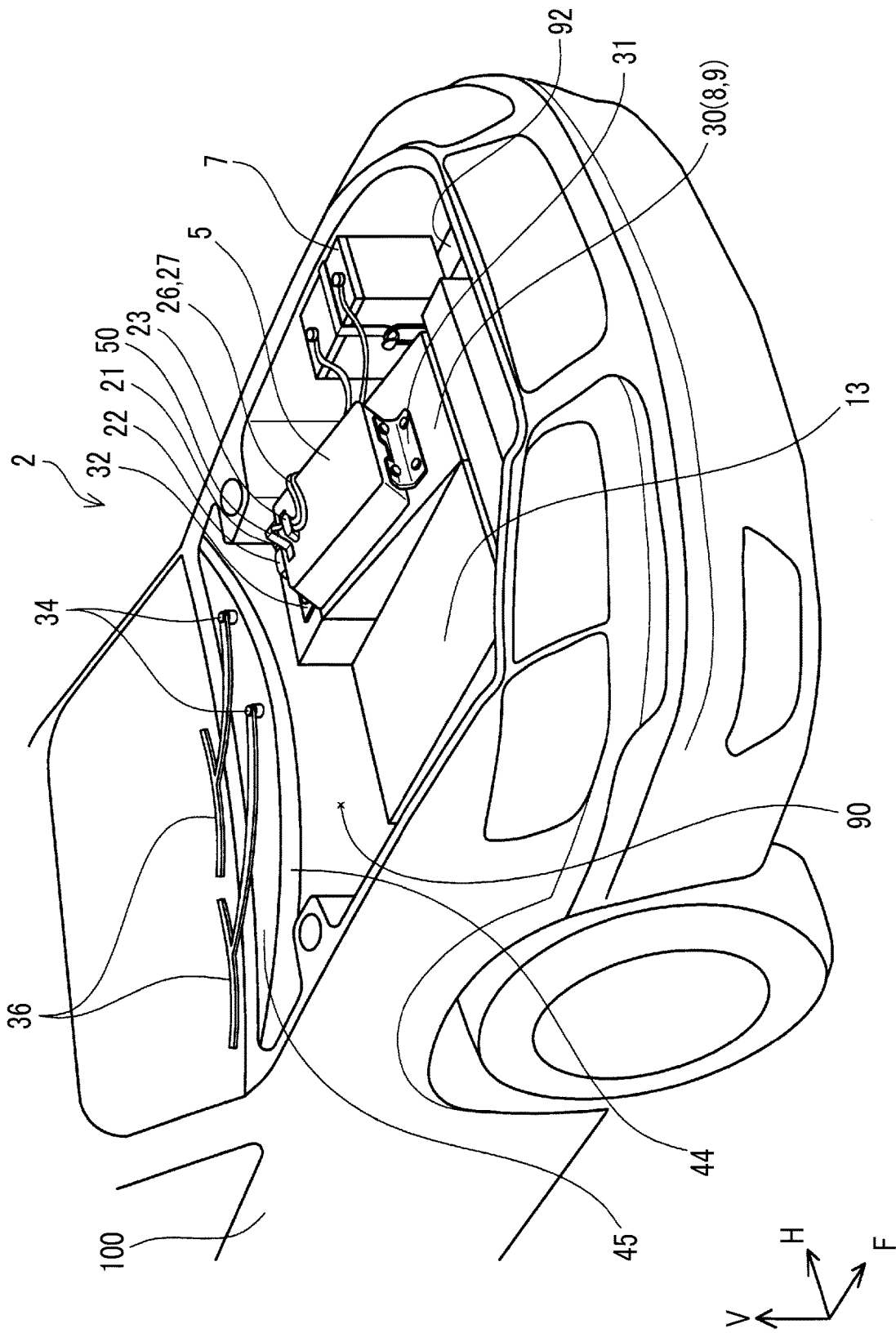
FIG. 2 is a perspective view illustrating device arrangement in a front compartment of the hybrid vehicle including the in-vehicle installation structure according to the embodiment.
Figure 3:
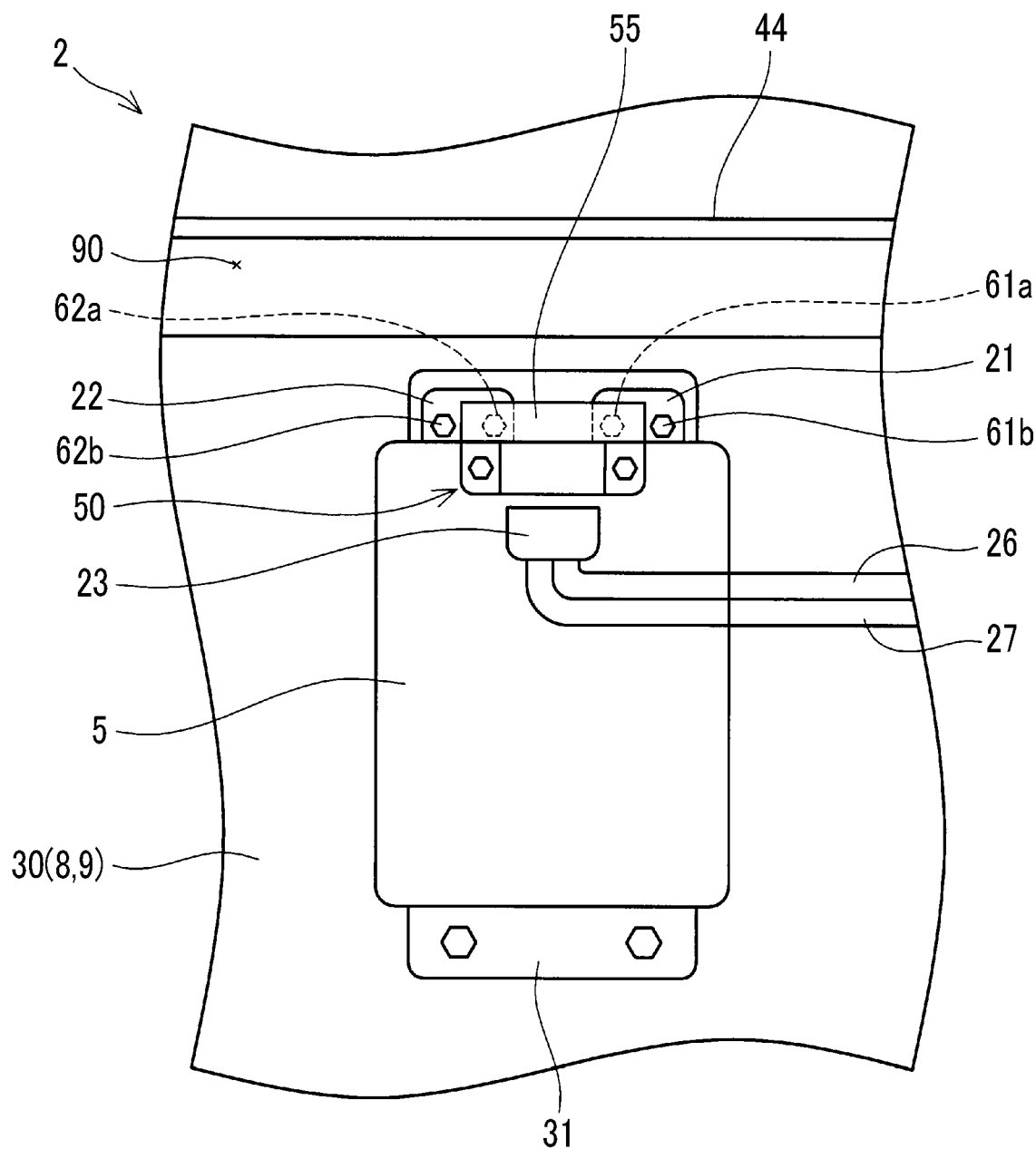
FIG. 3 is a plan view of an electric power control unit (PCU) installed in a vehicle.
Figure 3:
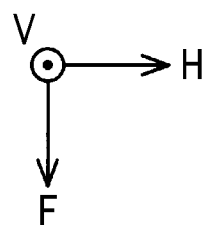
Figure 4:
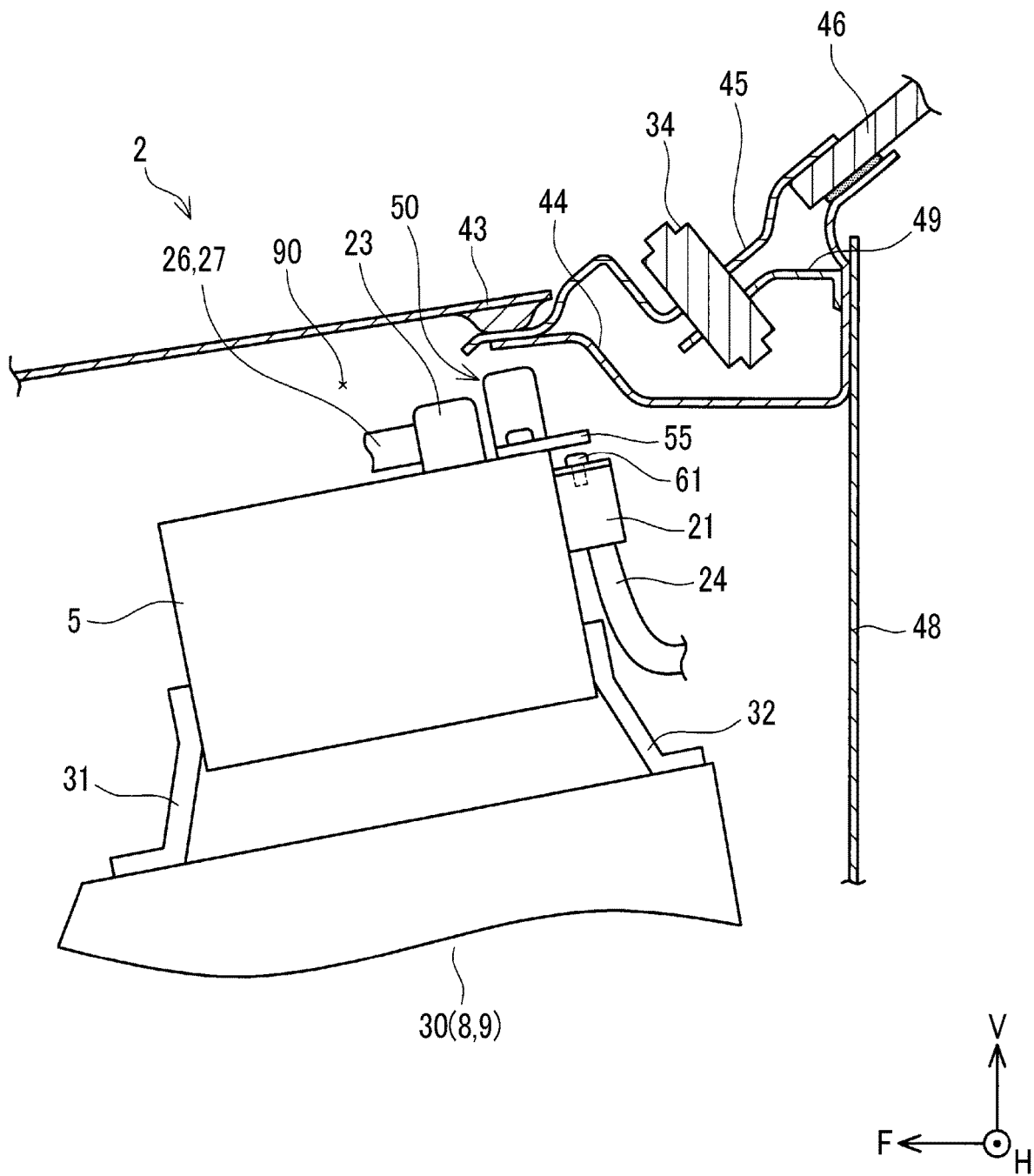
FIG. 4 is a side view of the PCU installed in the vehicle.

The in-vehicle installation structure 2 for the PCU 5 will be described with reference to FIGS. 2 to 5. FIG. 2 is a perspective view illustrating device arrangement in a front compartment 90 of the hybrid vehicle 100. FIG. 3 is a plan view of the PCU 5 installed in the front compartment 90. FIG. 4 is a side view of the PCU 5 installed in the front compartment 90. The plan view of the FIG. 3 illustrates the PCU 5 and the vicinity of the PCU 5. A reference numeral "43" in FIG. 4 represents a hood that covers the front compartment 90. The hood 43 is not shown in FIGS. 2 and 3.

The coordinate system in the drawings will be described. An F axis of the coordinate system represents a vehicle front side, an H axis represents a vehicle width direction, and a V axis represents a vehicle upper side. Hereinafter, "front" in the present disclosure means "front" in a vehicle front-rear direction and "rear" means "rear" in the vehicle front-rear direction.

In the front compartment 90, the engine 13, a transaxle 30 (motor 8), the PCU 5, and the auxiliary device battery 7 are accommodated. Although other various components are also accommodated in the front compartment 90, description of components other than those described above will be omitted here. In the transaxle 30, the motor 8 for traveling, the power distribution mechanism 9, and a differential gear are accommodated. That is, the transaxle 30 is a housing that accommodates the motor 8 for traveling. The transaxle 30 is connected to the engine 13 in the vehicle width direction. The output torque of the engine 13 and the output torque of the motor 8 are combined with each other by the power distribution mechanism 9 in the transaxle 30 and are transmitted to the axle 11 via the differential gear.

The engine 13 and the transaxle 30 are suspended between two side members 92 that extend in the vehicle front-rear direction below the front compartment 90. In FIG. 2, one of the side members is hidden and cannot be seen. The PCU 5 is fixed an upper portion the transaxle 30.

The PCU 5 is fixed to the transaxle 30. More specifically, the PCU 5 is fixed to the upper portion of the transaxle 30 via a front bracket 31 and a rear bracket 32. As illustrated in FIG. 4, a gap is secured between an upper surface of the transaxle 30 and the PCU 5. That is, the PCU 5 is not in direct contact with the transaxle 30 and is supported by the transaxle 30 via the front bracket 31 and the rear bracket 32. This is for protecting the PCU 5 from vibration of the engine 13 or vibration of the motor 8. Although not shown, a vibration proof bush is inserted between the front bracket 31 and the PCU 5 and between the rear bracket 32 and the PCU 5. Since the PCU 5 is supported by the front bracket 31 and the rear bracket 32, the PCU 5 moves back when receiving a collision load at the time of vehicle collision, in some cases.

A rear upper portion (rear side of upper surface) of the PCU 5 is provided with the low-voltage connector 23. The low-voltage connector 23 connects the low-voltage electric power line 26 and the PCU wire harness 27 to the PCU 5, the low-voltage electric power line 26 being connected to the auxiliary device battery 7 and the PCU wire harness 27 being connected to the HV controller 6.

As illustrated in FIG. 3, a rear surface of the PCU 5 is provided with the high-voltage connector 21 and the air conditioner connector 22. The high-voltage connector 21 is a connector that connects the high-voltage electric power line 24 to the PCU 5, the high-voltage electric power line 24 being connected to the high-voltage battery 3 illustrated in FIG. 1. The air conditioner connector 22 is a connector that connects the air conditioner electric power line 25 to the PCU 5, the air conditioner electric power line 25 being an electric power line through which the electric power of the high-voltage battery 3 is transmitted to the air conditioner 19 from the PCU 5. In FIG. 3, the high-voltage electric power line 24 and the air conditioner electric power line 25 are not shown.

The high-voltage connector 21 is fixed to the PCU 5 with two bolts 61a, 61b. The bolts 61a, 61b overlap each other in FIG. 4 and are collectively represented by a reference numeral "61". The two bolts 61a, 61b are attached to the PCU 5 in a direction from the upper side to a lower side. A reinforcement plate 55 of a protector 50 is positioned immediately above a bolt head of the bolt 61a. It is not possible to attach or detach the bolt 61a without removing the protector 50. Similarly, the air conditioner connector 22 is fixed to the PCU 5 with two bolts 62a, 62b. The bolts 62a, 62b overlap the bolts 61 and cannot be seen in FIG. 4. The two bolts 62a, 62b are attached to the PCU 5 in a direction from the upper side to the lower side. The reinforcement plate 55 of the protector 50 is positioned immediately above a bolt head of the bolt 62a. It is not possible to attach or detach the bolt 62a without removing the protector 50.

The protector 50 is a component that protects the low-voltage connector 23. However, the protector 50 also has a function of protecting the high-voltage connector 21 and the air conditioner connector 22 and a function equivalent to an interlock as a secondary function. It is not possible to attach or detach the high-voltage connector 21 and the air conditioner connector 22 without removing the protector 50. Forgetting to attach or detach the high-voltage connector 21 or the air conditioner connector 22 can be restrained since an operation of attaching or detaching the high-voltage connector 21 and the air conditioner connector 22 is a troublesome operation necessarily accompanied by attachment or detachment of the protector 50. The above description describes the function equivalent to an interlock of the protector 50. The function of protecting the high-voltage connector 21 and the air conditioner connector 22 will be described later.

A cowl panel 44 that is made of metal is disposed on a rear side of the front compartment 90 in the vehicle front-rear direction. The cowl panel 44 is connected to a dash panel 48 that separates the front compartment 90 and a vehicle cabin from each other. The cowl panel 44 extends in the vehicle width direction and a section of the cowl panel 44, which is cut along a plane extending in the vehicle front-rear direction (F-axis direction in drawing) and a vehicle height direction (V-axis direction in drawing), has a curved shape open to the upper side, as illustrated in FIG. 4. The "curved shape open to the upper side" is, in other words, a curved shape that protrudes downward. A rear edge of the cowl panel 44 is in contact with a lower edge of a windshield 46 and a front edge of the cowl panel 44 is in contact with the hood 43 that covers the front compartment 90 (refer to FIG. 4).

An upper portion of the cowl panel 44 that is open to the upper side is covered by a cowl top panel 45 that is made of resin. A wiper pivot 34 is disposed above the cowl panel 44 (disposed inside curve). The wiper pivot 34 is supported by a pivot holder 49. The pivot holder 49 is fixed to the cowl panel 44. The wiper pivot 34 penetrates the cowl top panel 45 such that a portion of the wiper pivot 34 is exposed. The wiper pivot 34 is a component serving as a rotation shaft of a wiper arm. The wiper pivot 34 and the wiper arm are not shown in FIG. 3 and the wiper arm is not shown in FIG. 4.

As illustrated in FIG. 4, the cowl panel 44 is positioned behind the low-voltage connector 23. When the PCU 5 moves back due to an impact of vehicle collision, the low-voltage connector 23 may come into contact with the cowl panel 44 that is made of metal. When the low-voltage connector 23 comes into contact with the cowl panel 44 and the low-voltage connector 23 is damaged, the discharge command that is transmitted from the HV controller 6 through the PCU wire harness 27 may not be transmitted to the discharge circuit 17 in the PCU 5. Therefore, the PCU 5 is provided with the protector 50 behind the low-voltage connector 23 such that damage to the low-voltage connector 23 that is generated when the PCU 5 moves back is reduced.

The protector 50 is positioned behind the low-voltage connector 23 and extends upward from the PCU 5. The protector 50 is made of metal such as iron and has a relatively high rigidity. When the PCU 5 moves back due to the impact of vehicle collision, the protector 50 comes into contact with the cowl panel 44 such that the low-voltage connector 23 is protected.

Alternatively, there is also a possibility that an upper portion of the high-voltage connector 21 or the air conditioner connector 22 comes into contact with the cowl panel 44 when the PCU 5 moves back due to the impact of vehicle collision. The reinforcement plate 55 extends rearward from a lower end of the protector 50. The reinforcement plate 55 extends to a space above the vicinity of the high-voltage connector 21 and the air conditioner connector 22. The reinforcement plate 55 of the protector 50 protects the high-voltage connector 21 and the air conditioner connector 22 from interference with the cowl panel 44.

Figure 5:
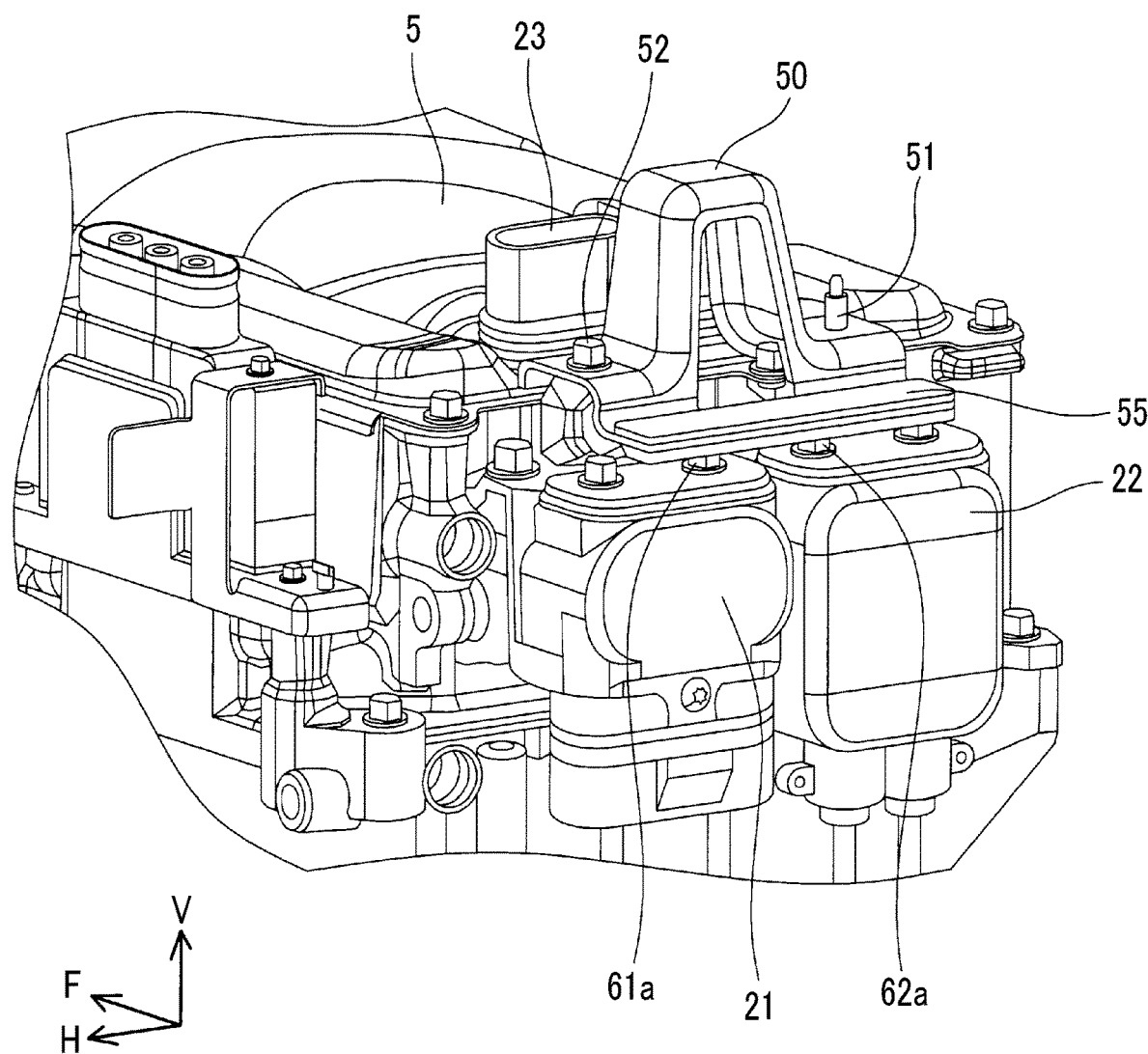
FIG. 5 is a perspective view of a rear upper portion of the PCU.

In FIGS. 2 to 4, the protector 50 is schematically illustrated for the sake of easy understanding. With reference to FIG. 5, the configuration of the protector 50 will be described more specifically. FIG. 5 is a view of the protector 50 as seen from a position diagonally behind the protector 50. The protector 50 has a reversed V-shape and a first end of the V-shape is fitted onto a pin 51 provided on the upper surface of the PCU 5 and a second end of the protector 50 is fixed to the PCU 5 with a bolt 52. The reinforcement plate 55 is provided such that opposite tip ends of the V-shape are connected to each other. In other words, the protector 50 has a shape of which the width decreases toward the upper side and the lower end of the protector 50 is provided with the reinforcement plate 55.

The reinforcement plate 55 extends to the vehicle rear side such that the reinforcement plate 55 passes through the space above the vicinity of the high-voltage connector 21 and the air conditioner connector 22. The reinforcement plate 55 is provided to increase the strength of the protector 50 and to protect the high-voltage connector 21 and the air conditioner connector 22 as described above.

As described above, the reinforcement plate 55 of the protector 50 covers the bolt 61a with which the high-voltage connector 21 is fixed to the PCU 5 and the bolt 62a with which the air conditioner connector 22 is fixed to the PCU 5. In order to attach or detach the high-voltage connector 21 or the air conditioner connector 22, it is needed to remove the protector 50 first. This is helpful in restraint of forgetting to attach or detach the high-voltage connector 21 or the air conditioner connector 22.

As described above, in the in-vehicle installation structure 2 according to the embodiment, the protector 50 is provided behind the low-voltage connector 23 of the PCU 5 such that the low-voltage connector 23 is restrained from being damaged due to collision with the cowl panel 44 at the time of vehicle collision.

Features of the in-vehicle installation structure 2 described in the embodiment will be summarized below. The PCU 5 is fixed to an upper portion of a housing (transaxle 30) that accommodates the traveling motor 8 in the front compartment 90. The PCU 5 is provided with the capacitor 16 that smooths an electric current of a direct current electric power source (high-voltage battery 3) and the discharge circuit 17 that discharges the capacitor 16. A wire harness (PCU wire harness 27) through which the discharge command to discharge the capacitor 16 is transmitted from another device (HV controller 6) is connected to a connector (low-voltage connector 23) provided on the rear upper portion of the PCU 5. In the front compartment 90, the cowl panel 44 is disposed behind the low-voltage connector 23. In addition, the protector 50 that protects the low-voltage connector 23 is provided behind the PCU 5. The protector 50 also protects the high-voltage connector 21 and the air conditioner connector 22 attached to the rear surface of the PCU 5 in addition to the low-voltage connector 23.

The reinforcement plate 55 of the protector 50 is positioned such that attachment and detachment of the bolts 61a, 62a, with which the high-voltage connector 21 and the air conditioner connector 22 are fixed to the PCU 5, is inhibited. It is needed to remove the protector 50 before attachment and detachment of the high-voltage connector 21 or the air conditioner connector 22. This results in restraint of forgetting to attach or detach the high-voltage connector 21 or the air conditioner connector 22.

Points to be noted in relation to the technology described in the embodiment will be described. The transaxle 30 is an example of the housing and is an example of a structure disposed in the front compartment. The electric power control unit (PCU 5) is an example of an electric device. The target to which the technology disclosed in the present disclosure is to be applied is not limited to the electric power control unit fixed onto the transaxle and the technology can be applied to various electric devices fixed onto various structures disposed in the front compartment. The in-vehicle installation structure disclosed in the present disclosure can also be applied to an electric vehicle provided with no engine.

While specific examples of the present disclosure have been described above in detail, these examples are merely an example and do not limit the scope of the claims. The technology described in the claims includes those made through various changes and modifications to the specific examples described above. The technical elements in the t description or the drawings exert technical usefulness either independently or through various combinations. An Applicable embodiment of the present disclosure is not limited to the combinations described in the this application. Further, with the technologies exemplified in the present disclosure or the drawings, it is possible to achieve a plurality of objects at the same time, and achieving any one of those objects gives technical usefulness to the technologies.

What is claimed is:

1. An in-vehicle installation structure for an electric device installed in a front compartment of a vehicle, the in-vehicle installation structure comprising:
   a structure disposed in a front compartment of a vehicle;
   the electric device fixed to an upper portion of the structure;
   a connector connected to a rear portion of an upper portion of the electric device; and
   a protector extending upward from the electric device, the protector being disposed behind the connector of the electric device and being fixed to the upper portion of the electric device but not through the connector.

2. The in-vehicle installation structure according to claim 1, further comprising another connector connected to a rear surface of the electric device,
   wherein the protector covers a position at which a fixing member that fixes the other connector to the electric device is detached.

3. The in-vehicle installation structure according to claim 1, wherein:
   the protector has a shape of which a width decreases toward an upper side; and
   a lower end of the protector is provided with a reinforcement member.

4. The in-vehicle installation structure according to claim 1, wherein:
   the structure is a housing that accommodates a motor for traveling; and
   the electric device is an electric power controller that supplies drive electric power to the motor.

5. The in-vehicle installation structure according to claim 1, wherein:
   the protector has an inverted V-shape.

6. The in-vehicle installation structure according to claim 1, wherein:
   the protector abuts the upper portion of the electric device.

\* \* \* \* \*